Figure 1:
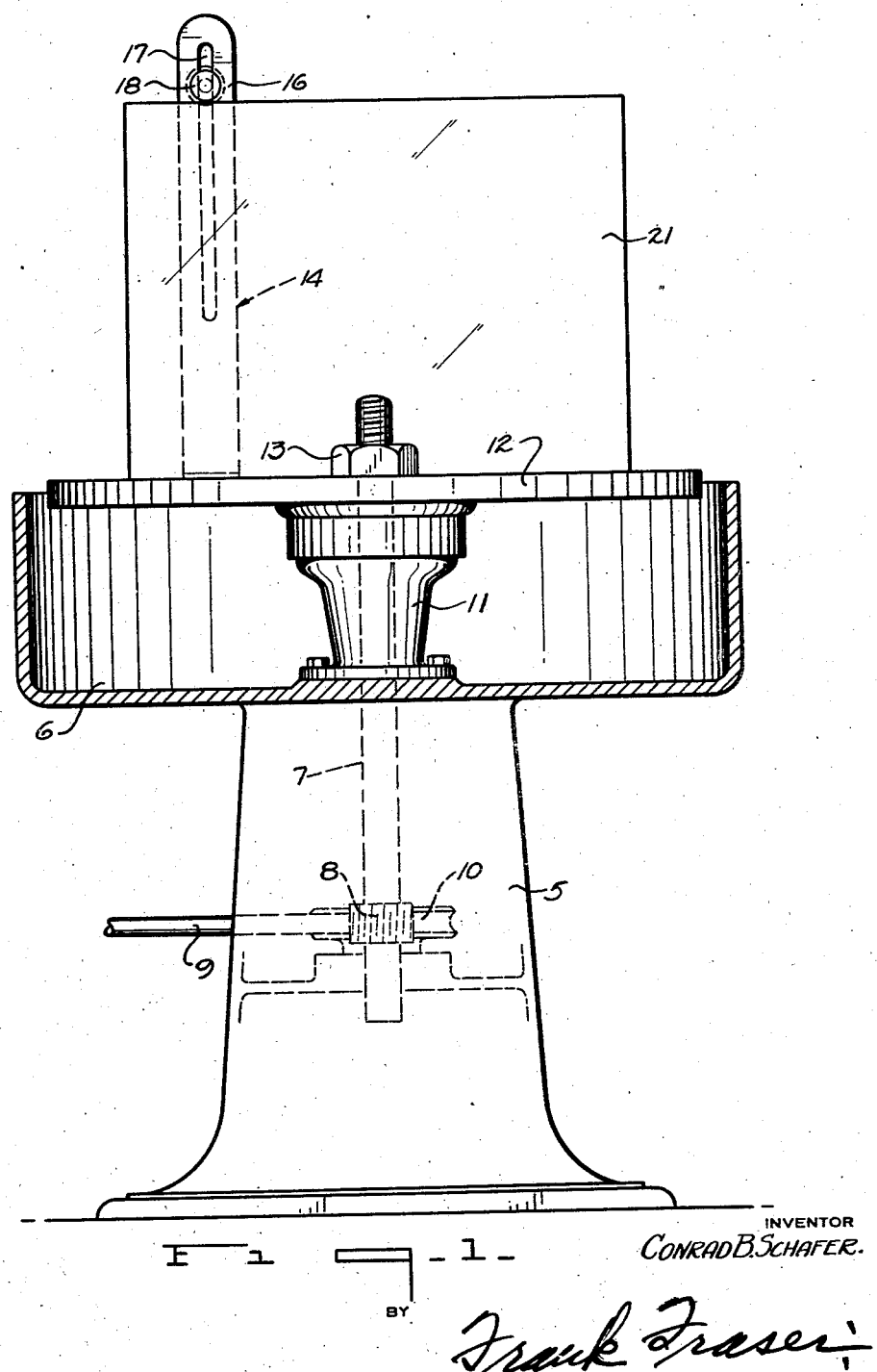

Jan. 1, 1935.  C. B. SCHAFER  1,986,537
GRINDING MACHINE
Filed April 4, 1931  2 Sheets-Sheet 1

INVENTOR
CONRAD B. SCHAFER.
BY
Frank Fraser
ATTORNEY

Jan. 1, 1935.   C. B. SCHAFER   1,986,537
GRINDING MACHINE
Filed April 4, 1931   2 Sheets-Sheet 2
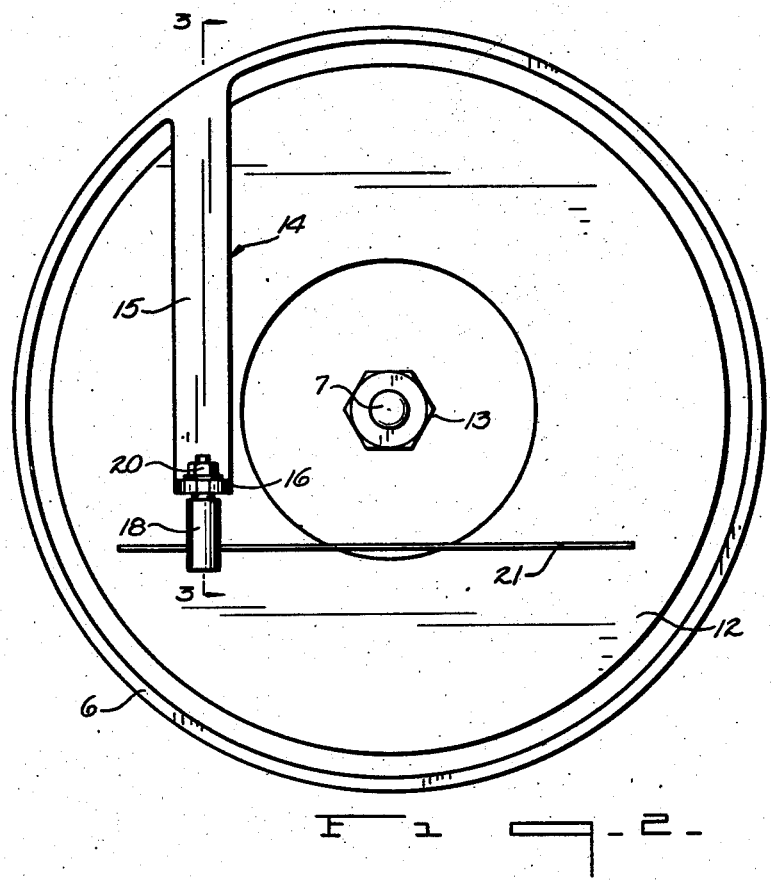
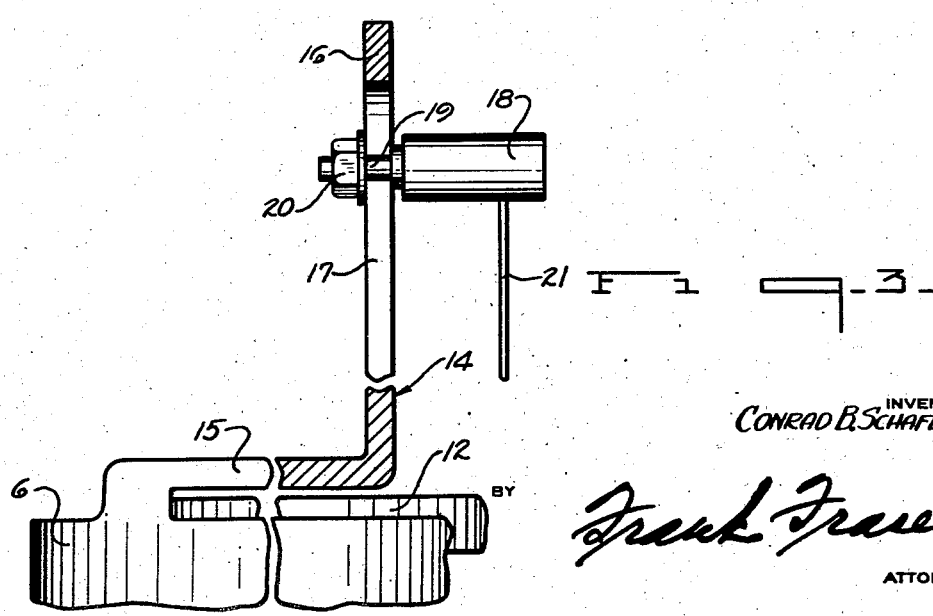
INVENTOR
CONRAD B. SCHAFER.
BY
Frank Fraser
ATTORNEY Patented Jan. 1, 1935

1,986,537

UNITED STATES PATENT OFFICE 1,986,537

GRINDING MACHINE

Conrad B. Schafer, Toledo, Ohio, assignor to Libbey-Owens-Ford Glass Company, Toledo, Ohio, a corporation of Ohio Application April 4, 1931, Serial No. 527,713

4 Claims. (Cl. 51—109)

The present invention relates broadly to glass grinding apparatus and more particularly to a machine for use in grinding the edges of sheets or plates of glass or the like.

According to this invention, there is provided a machine having a grinding or roughing plate or wheel rotatable about a substantially vertical axis. The edges of the glass sheets are ground upon a machine of this character by bringing the said edges into engagement with the upper surface of the grinding wheel during rotation thereof in a manner well-known in the art. In grinding the glass sheets, each sheet or plate of glass has to be checked for size and this checking has heretofore been ordinarily accomplished on a metal template positioned to the side of said machine. Hence, when the operator considered the sheet edge to have been sufficiently ground, it was necessary for him to remove the glass from the machine, check it on the metal template for size, and then return it to the machine for further grinding in the event such additional grinding was found to be necessary. This practice of checking the glass naturally results in the loss of both time and labor; renders the grinding operation more expensive; and, in addition, does not afford the most efficient check for accurate size.

An important object of the invention, therefore, is the provision of means associated with the grinding machine and cooperating with the grinding or roughing wheel or plate thereof whereby the size of the individual sheets or plates of glass may be accurately checked or gauged in a rapid and convenient manner and without the necessity of removing the glass sheet from the machine, to the end that a saving in both time and labor may be achieved in the grinding operation.

Other objects and advantages of the invention will become more apparent during the course of the following description when taken in connection with the accompanying drawings.

In the drawings forming a part of this application and wherein like numerals are employed to designate like parts throughout the same, Fig. 1 is an elevation, partially in section, of a grinding machine constructed in accordance with the present invention, Fig. 2 is a top plan view thereof, and Fig. 3 is a detail section taken substantially on line 3—3 of Fig. 2.

The grinding machine herein provided includes a standard or base portion 5 carrying at its upper end a basin or tub 6. Mounted centrally within the base portion 5 is a vertically disposed spindle or shaft 7 driven in any desired manner such as by means of the worm 8 keyed to drive shaft 9 and meshing with worm gear 10 fixed to the lower end of spindle 7. The spindle 7 projects upwardly through a bearing support 11 and mounted upon the upper end thereof is the grinding or roughing wheel or plate 12 carried upon bearing support 11 and maintained in position by a nut 13. The basin 6 surrounds the roughing wheel and is slightly larger in diameter than the same so that it will catch all of the surplus abrasive or other grinding medium which may be employed in the grinding operation.

Carried by the basin 6, preferably to the rear of the grinding machine, is a bracket arm 14 comprising a horizontal portion 15 projecting forwardly over the roughing wheel 12 and terminating in a vertically disposed portion 16 which is provided with a slot 17 extending throughout substantially the entire length thereof. Carried by the vertical portion 16 of bracket arm 14 is a horizontally disposed roller 18, said roller being mounted upon a pin 19 received within the slot 17 and having threaded upon its rear end a nut 20, whereby the vertical position of the roller with respective to the roughing wheel may be varied as desired. The roller 18 is disposed above the roughing wheel in substantially parallel relation with respect thereto and is adapted to cooperate therewith in a manner to gauge the size of the glass sheet or plate being ground.

In the operation of the grinding machine above described, the roughing wheel 12 is preferably continuously rotated. When it is desired to grind the edges of a glass sheet or plate 21, the said sheet is manually held by an operator in a vertical position above the roughing wheel with the edge to be ground in engagement therewith, and this edge is then ground by the rotation of the grinding wheel in combination with a suitable abrasive material which is usually supplied thereto. Before starting upon the grinding operation, however, the vertical position of the roller 18 with respect to the roughing wheel is first regulated so that the distance between the lowermost part of the roller and the upper surface of the roughing wheel is equal to the size of the finished sheet or plate desired. When the operator is of the opinion that sufficient glass has been ground from the edges of the sheet so that the said sheet is of the desired size, it becomes necessary for him to check or gauge the sheet. This he accomplishes by passing the sheet while maintained in a vertical position between the roughing wheel and the roller 18. In the event the plate is too large to pass beneath the roller, the operator knows that the glass has not been sufficiently ground and the grinding is then continued until the sheet will just pass beneath the roller 18, at which time the operator will know that the sheet is of the desired size. From the above, it will be readily apparent that, with the present invention, the individual sheets of glass can be accurately checked for size, rapidly and conveniently, and without the necessity of removing the sheets from the machine. The roller 18 will in no way interfere with the proper grinding operation. If desired, a fixed bar can be substituted for the roller although the use of a roller is preferred.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for grinding the edges of glass sheets or the like, the combination with a surfacing wheel rotatable about a substantially vertical axis and upon which the sheet is adapted to be manually supported on edge while being surfaced, of a roller mounted in a fixed position horizontally above and in parallel relation with respect to the upper surface of said surfacing wheel and cooperating therewith to gauge the size of the sheet being ground when it is passed manually in a vertical position therebetween, the distance between the roller and surfacing wheel being equal to the size of sheet desired.

2. In an apparatus for grinding the edges of glass sheets or the like, the combination with a surfacing wheel rotatable about a substantially vertical axis and upon which the sheet is adapted to be manually supported on edge while being surfaced, of a roller mounted in a fixed position horizontally above and in parallel relation with respect to the upper surface of said surfacing wheel and cooperating therewith to gauge the size of the sheet being ground when it is passed manually in a vertical position therebetween, the distance between the roller and surfacing wheel being equal to the size of sheet desired, and means for adjusting said roller vertically toward and away from the surfacing wheel.

3. In an apparatus for gauging the width of a sheet of glass or the like, a base portion, a substantially vertical spindle rotatably supported by said base portion, a surfacing wheel carried at the upper end of said spindle and upon which the glass sheet is supported on edge while being surfaced, a receptacle carried at the upper end of the base portion and arranged in surrounding relation to the surfacing wheel, said receptacle being of a slightly larger diameter than the wheel and adapted to catch the surplus grinding material discharged therefrom, a bracket arm also carried by the receptacle and including a substantially vertically disposed portion positioned above the surfacing wheel, and a member carried by the vertically disposed portion of said arm and being also positioned above said surfacing wheel in fixed spaced relation relative thereto and parallel therewith, said member cooperating with the upper surface of the said surfacing wheel to gauge the size of the glass sheet being ground when it is passed in a vertical position therebetween.

4. In an apparatus for gauging the width of a sheet of glass or the like, a base portion, a substantially vertical spindle rotatably supported by said base portion, a surfacing wheel carried at the upper end of said spindle and upon which the glass sheet is supported on edge while being surfaced, a receptacle carried at the upper end of the base portion and arranged in surrounding relation to the surfacing wheel, said receptacle being of a slightly larger diameter than the wheel and adapted to catch the surplus grinding material discharged therefrom, a bracket arm also carried by the receptacle and comprising a substantially horizontal portion projecting over the surfacing wheel and terminating in a vertically disposed portion having a vertically arranged slot formed therein, and a horizontally disposed roller carried by the vertical portion of said arm and slidably engaged within said slot, said roller being mounted in fixed spaced relation relative to and parallel with the upper surface of said surfacing wheel and cooperating therewith to gauge the size of the glass sheet being ground when it is passed in a vertical position therebetween.

CONRAD B. SCHAFER.